United States Patent
Guo et al.

(10) Patent No.: US 11,402,319 B2
(45) Date of Patent: Aug. 2, 2022

(54) TESTING PLATFORM WITH FLOATING CYLINDER FOR HIGH-PRESSURE AND HIGH-SPEED RECIPROCATING SEALING EXPERIMENT

(71) Applicant: TSINGHUA UNIVERSITY, Beijing (CN)

(72) Inventors: Fei Guo, Beijing (CN); Chong Xiang, Beijing (CN); ZhaoXiang Zhang, Beijing (CN); YiJie Huang, Beijing (CN); XiaoHong Jia, Beijing (CN); ShuangFu Suo, Beijing (CN); YuMing Wang, Beijing (CN)

( * ) Notice: Subject to any disclaimer, the term of this patent is extended or adjusted under 35 U.S.C. 154(b) by 0 days.

(21) Appl. No.: 17/284,735

(22) PCT Filed: Oct. 26, 2019

(86) PCT No.: PCT/CN2019/113494
§ 371 (c)(1),
(2) Date: Apr. 12, 2021

(87) PCT Pub. No.: WO2021/042461
PCT Pub. Date: Mar. 11, 2021

(65) Prior Publication Data
US 2021/0325297 A1  Oct. 21, 2021

(30) Foreign Application Priority Data
Sep. 5, 2019 (CN) .......................... 201910838973.5

(51) Int. Cl.
G01N 19/02 (2006.01)
(52) U.S. Cl.
CPC .................................. G01N 19/02 (2013.01)

(58) Field of Classification Search
CPC ....................................................... G01N 19/02
(Continued)

(56) References Cited

FOREIGN PATENT DOCUMENTS

| CN | 103512743 A | 1/2014 |
|----|----|----|
| CN | 104132805 A | 11/2014 |

(Continued)

Primary Examiner — Nimeshkumar D Patel
Assistant Examiner — Nashmiya S Fayyaz
(74) Attorney, Agent, or Firm — Novoclaims Patent Services LLC; Mei Lin Wong

(57) ABSTRACT

A testing platform with a floating cylinder for high-pressure and high-speed reciprocating sealing experiment, characterized in that, includes a frame, a cylinder body for testing and a high-speed driving device, the frame comprises a horizontal rolling guide rail (9), the cylinder body for testing comprises a cylinder, the cylinder is floatingly mounted on the rolling guide rail and is mounted to the frame through a tension-compression sensor which is in the same direction as the rolling guide rail, the cylinder is cylindrical as a whole, has a cavity in a middle and openings on two sides with a diameter slightly greater than a diameter of a test rod, the cylinder includes a left end cover affixed on a left side, a right end cover affixed on a right side, a left seal between the left end cover and the cylinder, a right seal between the right end cover and the cylinder, the piston rod penetrates into the cylinder horizontally and passes through the left end cover, the left seal, the right seal and the right end cover, the piston rod has one side connected to the high-speed driving device with a motor. The present invention can provide stable high-pressure and high-speed working conditions, can accurately measure the frictional force of the sealing ring, and provide more extensive experimental conditions and experimental data for the research of reciprocating sealing performance.

2 Claims, 1 Drawing Sheet

(58) Field of Classification Search
USPC .............................................................. 73/9
See application file for complete search history.

(56) References Cited

FOREIGN PATENT DOCUMENTS

| | | | |
|---|---|---|---|
| CN | 104568275 A | | 4/2015 |
| CN | 206869584 U | | 1/2018 |
| CN | 207961125 U | | 10/2018 |
| CN | 109060270 A | | 12/2018 |
| CN | 110131239 A | * | 8/2019 |
| CN | 110131239 A | | 8/2019 |
| CN | 113484014 A | * | 10/2021 |

* cited by examiner

TESTING PLATFORM WITH FLOATING CYLINDER FOR HIGH-PRESSURE AND HIGH-SPEED RECIPROCATING SEALING EXPERIMENT

BACKGROUND OF THE PRESENT INVENTION

Field of Invention

The present invention relates to the technical field of rubber-plastic reciprocating sealing, and particularly relates to a testing platform with a floating cylinder for high-pressure and high-speed reciprocating sealing experiment.

Description of Related Arts

Reciprocating seal refers to the dynamic seal that the relative motion between the two sealing interfaces is reciprocating, which is the key core component to ensure the normal operation of hydraulic and pneumatic systems and its performance affects the stability and safety of the equipment and plays a very important role in modern industries such as aerospace, machinery, and automobiles. The research on reciprocating seals has a history of more than 80 years, and the theoretical models and experimental simulations of the technology have been relatively mature under low-pressure and low-speed conditions. However, with the continuous improvement of the assembly performance of the main engine in recent years, the research of reciprocating seal must also make a breakthrough in the direction of ensuring the sealing performance and seal life under high pressure and high speed. The severe working conditions of high pressure and high speed put forward higher requirements for reciprocating sealing technology.

Reciprocating sealing technology is a comprehensive sealing technology involving different disciplines such as materials science, mechanics, mechanical engineering, tribology and heat transfer. The measurement of physical quantities such as friction and leakage in the reciprocating seal system is inherently difficult, and it will be more difficult to measure under high pressure and high-speed conditions. Not only that, it is also technically difficult to construct the high pressure environment in the system and make the piston rod move under a relatively stable high-speed condition at the same time. In addition, the severe working conditions of high pressure and high speed will bring a large amount of frictional heat caused by the friction of the sealing interface which can only be transported away by the piston rod and the oil in the experimental cylinder, causing more serious temperature rise to the sealing system. For such a high-pressure and high-temperature system, a reasonable cooling system must be designed to control the temperature of the sealed interface and the experimental cylinder.

SUMMARY OF THE PRESENT INVENTION

In order to overcome the above shortcomings of the prior art so that the experimental device can successfully simulate the harsh working conditions of high pressure and high speed and solve the measurement problems under this working condition, the present invention provides a testing platform with a floating cylinder for high-pressure and high-speed reciprocating sealing experiment. An experimental cylinder is the core of the whole set of experimental equipment, which is matched with a driving device for providing high-speed reciprocating actions and a cooling device for system cooling, and the experimental cylinder is installed in a floating manner to accurately measure the friction of the seal ring.

In order to achieve the objective above, the technical solution adopted by the present invention is as follows:

A testing platform with a floating cylinder for a high-pressure and high-speed reciprocating sealing experiment, characterized in that, comprising: a frame 1, a cylinder body for testing and a high-speed driving device, a rolling guide rail 9 is fixed on the frame 1, the cylinder body for testing comprises a cylinder 6, the cylinder 6 is floatingly mounted on the rolling guide rail 9 and is mounted to the frame 1 through a tension-compression sensor 10 which is in the same direction as the rolling guide rail 9, the cylinder 6 is cylindrical as a whole and has a cavity in a middle thereof and openings on two sides thereof, a diameter of the opening is slightly greater than a diameter of a test rod 13, the cylinder 6 comprises a left end cover 3 affixed on a left side thereof, a right end cover 11 affixed on a right side thereof, a left seal 21 between the left end cover 3 and the cylinder 6, a right seal 15 between the right end cover 11 and the cylinder 6, the piston rod 13 penetrates into the cylinder 6 horizontally and penetrates the left end cover 3, the left seal 21, the right seal 15 and the right end cover 11, the piston rod 13 has one side connected to the high-speed driving device with a motor 28.

The cylinder 6 has an outer wall matched and fixed with inner walls of a left water jacket 4 and a right water jacket 8 to secure into position, the left water jacket 4 and the right water jacket 8 are installed on the rolling guide rail 9 and is capable of movement in a horizontal direction.

The cylinder 6 is positioned on top of the frame 1, the frame 1 comprises a left support seat 2 on a left side of the cylinder 6 and a right support seat 12 on a right side of the cylinder 6, a left linear bearing 22 has an outer wall matched and fixed with a mounting hole of the left support seat 2 to secure into position, a right linear bearing 14 has an outer wall matched and fixed with a mounting hole of the right support seat 12 to secure into position, the piston rod 13 penetrates through the left linear bearing 22 and the right linear bearing 14.

The outer wall of the cylinder 6 is provided with a left water groove 5 and a right water groove 7, the left water jacket 4 has a left water inlet 20 and a left water outlet 19 connected to two ends of the left water groove 5 respectively, the right water jacket 8 has a right water inlet 17 and a right water outlet 16 connected to two ends of the right water groove 7 respectively, the left water inlet 20 is connected to a water pump, the left water outlet 19 is connected to the right water inlet 17 by a connecting pipe, the right water outlet 16 is connected to a water tank.

The outer wall of the cylinder 6 is provided with an oil inlet 18.

The high-speed driving device comprises a motor 28, an eccentric wheel 26 affixed on an output shaft of the motor 28, a connecting member 23 affixed on one side of the piston rod 13 and hinged to a joint bearing 24, the joint bearing 24 has a left side affixed to a right side of a guiding rod 25, a right side of the guiding rod 25 is a circular ring, and a rolling bearing 27 is installed between an inner side of the circular ring and an outer side of the eccentric wheel 26.

The motor 28 drives the eccentric wheel 26, the rolling bearing 27, the guiding rod 25 and the piston rod 13, and restricts a degree of movement of the piston rod 13 through the left linear bearing 22 and the right linear bearing 14 so as to realize a high-speed reciprocating linear movement of the piston rod 13.

The right water jacket 8 is connected to the frame 1 through the horizontal tension-compression 10, and a reading of the tension-compression 10 represents a frictional force of a sealing ring on the cylinder 6.

Compared to the existing technologies, the advantageous effect of the present invention is:

The present invention forms a slider-crank mechanism by combining transmission devices such as eccentric wheels, guide rods, linear bearings, etc. to realize a reciprocating high-speed movement of the piston rod. The arrangement of the linear bearings on both sides of the cylinder can effectively balance the moment of force transmitted by the guiding rod to the test rod. At the same time, by designing the moment of inertia of the eccentric wheel, the inertial impact caused by the high-speed reciprocating motion can be balanced. Through floating the entire cylinder body and connecting it to the frame with a force sensor, the measurement of the frictional force of the sealing ring is realize.

Compared with the conventional reciprocating test bench, the present invention can provide a stable high-pressure and high-speed working condition and can accurately measure the frictional force of the sealing ring and provide more extensive experimental conditions and experimental data for the research of reciprocating sealing performance.

DETAILED DESCRIPTION OF THE PREFERRED EMBODIMENT

Figure 1:
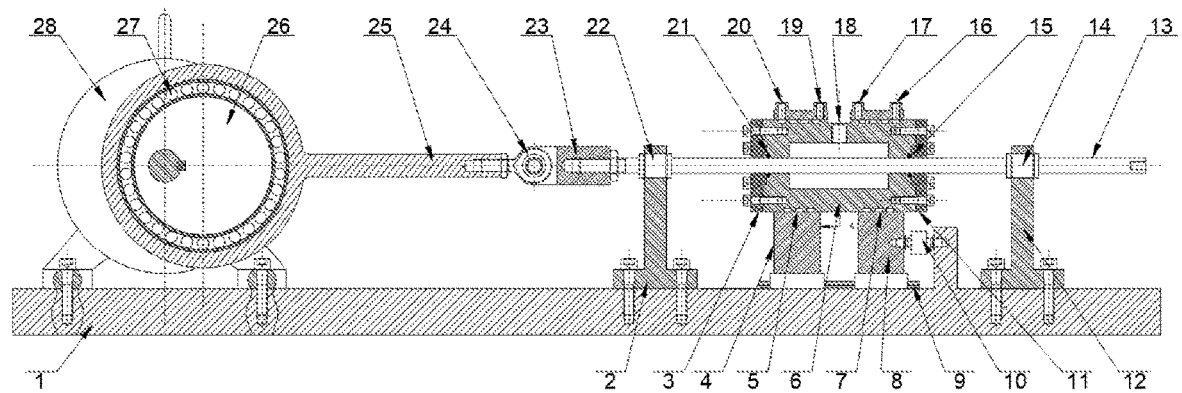
FIG. 1 is a schematic diagram of the overall structure of the present invention.
Figure 2:
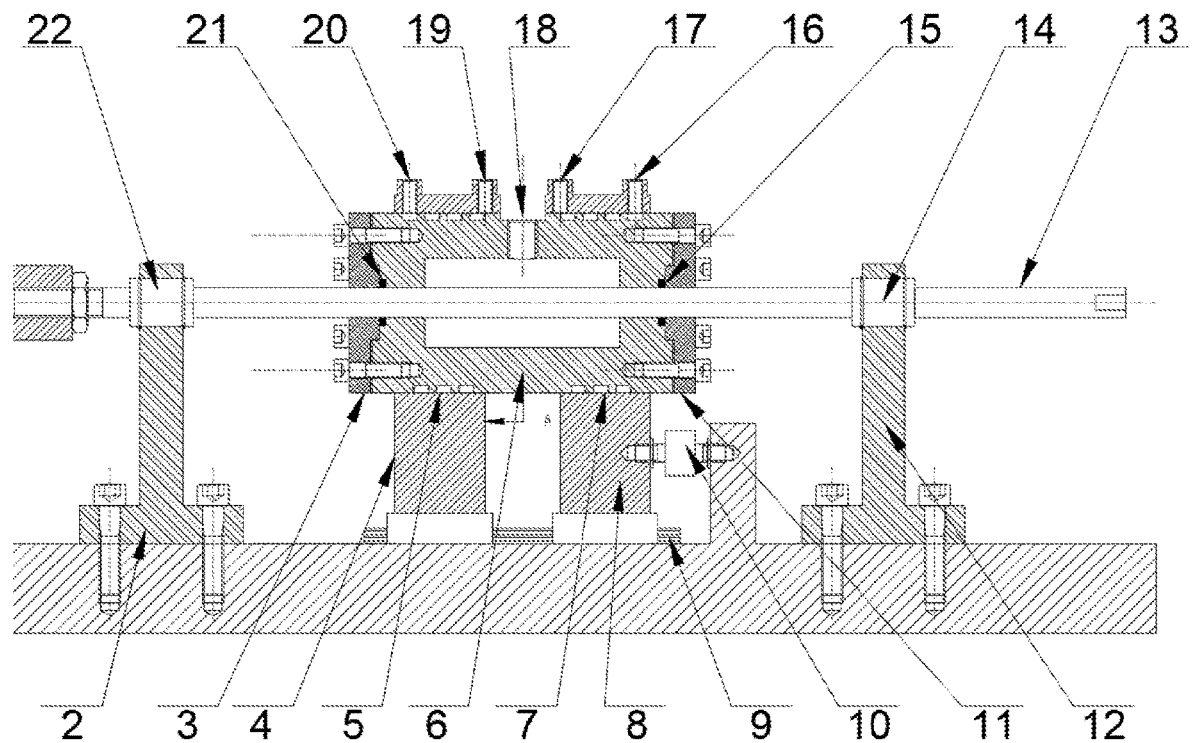
FIG. 2 is an enlarged view of the cylinder body.

The present invention is further described in detail with reference to the drawings and embodiments as follows:

Referring to FIG. 1 and FIG. 2, a testing platform with a floating cylinder for a high-pressure and high-speed reciprocating sealing experiment comprises a frame 1, a cylinder body for testing and a high-speed driving device.

The frame 1 provides necessary support for the entire platform. The cylinder body for testing includes a cylinder 6. The cylinder 6 is cylindrical as a whole and has a cavity in the middle and openings on two sides with a diameter slightly greater than a diameter of the test rod 13 so that the test rod 13 can be inserted therethrough. The cylinder 6 has an outer wall matched and fixed with inner walls of a left water jacket 4 and a right water jacket 8 to secure into position, the left water jacket 4 and the right water jacket 8 are installed on the rolling guide rail 9 and is capable of movement in a horizontal direction. The right water jacket 8 is connected to the frame 1 through the horizontal tension-compression sensor 10. Because the friction coefficient of the rolling guide rail 9 is extremely small, a reading of the tension-compression sensor 10 represents a frictional force of a sealing ring on the cylinder 6.

The outer wall of the cylinder 6 is provided with a left water groove 5 and a right water groove 7, the left water jacket 4 has a left water inlet 20 and a left water outlet 19 connected to two ends of the left water groove 5 respectively, the right water jacket 8 has a right water inlet 17 and a right water outlet 16 connected to two ends of the right water groove 7 respectively, the left water inlet 20 is connected to a water pump, the left water outlet 19 is connected to the right water inlet 17 by a connecting pipe, the right water outlet 16 is connected to a water tank. The outer wall of the cylinder 6 is further provided with an oil inlet 18.

The cylinder 6 comprises a left end cover 3 affixed on a left side thereof, a right end cover 11 affixed on a right side thereof, a left seal 21 between the left end cover 3 and the cylinder 6, a right seal 15 between the right end cover 11 and the cylinder 6, the piston rod 13 penetrates into the cylinder 6 horizontally and penetrates the left linear bearing 22, the left end cover 3, the left seal 21, the right seal 15, the right end cover 11 and the right linear bearing 14, an outer wall of the left linear bearing 22 is arranged to match and fix with a mounting hole open on the left support seat 2 to secure into position, a wall of the right linear bearing 14 is arranged to match and fix with a mounting hole of the right support seat 1 to secure into position, the piston rod 13 has one side connected to the high-speed driving device.

The high-speed driving device comprises a motor 28, an eccentric wheel 26 affixed on an output shaft of the motor 28, a connecting member 23 affixed on one side of the piston rod 13 and hinged to a joint bearing 24, the joint bearing 24 has a left side affixed to a right side of a guiding rod 25, a right side of the guiding rod 25 is a circular ring, and a rolling bearing 27 is installed between an inner side of the circular ring and an outer side of the eccentric wheel 26. The left support seat 2, the rolling guide rail 9, the right support seat 12 and the motor 28 are all fixedly supported on the frame 1.

The motor 28 drives the eccentric wheel 26, the rolling bearing 27, the guiding rod 25 and the piston rod 13, and restricts a degree of movement of the piston rod 13 through the left linear bearing 22 and the right linear bearing 14 so as to realize a high-speed reciprocating linear movement of the piston rod 13.

The working principle of the present invention is: During the experiment, first start the external hydraulic system, fill oil into the cylinder 6 through the oil inlet 18 and apply pressure, start the water pump, and the cooling water flows through the left water inlet 21, the left water groove 5, the left water outlet 20, the right water inlet 14, the right water groove 7 and the right water outlet 13 to form a cooling water channel to realize the cooling of the entire cylinder body. Then, start the motor 28 to drive the eccentric wheel 26, the rolling bearing 27, the guiding rod 25, and the piston rod 13 to achieve high-speed reciprocating motion. At this time, the external force on the entire cylinder can be measured by the tension-compression sensor 10. Since the friction coefficient of the rolling guide rail 9 is extremely small, the frictional force on the cylinder can be ignored, and the force measured by the tension-compression sensor 10 can be regarded as the frictional force of the sealing ring.

In summary, according to the present invention, the cylinder for testing is floatingly mounted on the rolling guide rail and is affixed on the testing platform through the tension-compression sensor. Since the friction coefficient of the rolling guide rail is extremely small, the frictional force exerted by the sealing ring on the cavity during the experiment can be directly measured. The driving device of the whole set of equipment is composed of electric motor, eccentric wheel, rolling bearing and guide rod, and the piston rod is restricted through two distant linear bearings so that the piston rod not only realizes high-speed reciprocating motion, but also balances the inertial impact caused by high-speed reciprocating motion by designing the rotational inertia of the eccentric wheel.

What is claimed is:

1. A testing platform with a floating cylinder for high-pressure and high-speed reciprocating sealing experiment, comprising: a frame, a rolling guide rail affixed on said frame, a cylinder having an outer wall matched and fixed with inner walls of a left water jacket and a right water jacket and supported by said left water jacket and said right water jacket to secure into position, wherein said left water jacket and said right water jacket are installed on said rolling guide rail and said cylinder is floatingly configured to move in a horizontal direction, said right water jacket is connected to said frame through a horizontal tension-compression sensor, and a reading of said tension-compression sensor represents a frictional force of a sealing ring on said cylinder, the outer wall of said cylinder is provided with an oil inlet, a left water groove and a right water groove, said left water jacket has a left water inlet and a left water outlet connected to said left water groove respectively, said right water jacket has a right water inlet and a right water outlet connected to said right water groove respectively, said left water inlet is connected to a water pump, said left water outlet is connected to said right water inlet by a connecting pipe, said right water outlet is connected to a water tank, said cylinder is cylindrical as a whole and has a cavity in a middle thereof and openings on two sides thereof, a diameter of said openings is slightly greater than a diameter of a piston rod, said cylinder comprises a left end cover affixed on a left side thereof, a right end cover affixed on a right side thereof, a left seal between said left end cover and said cylinder, a right seal between said right end cover and said cylinder, said piston rod penetrates inside said cylinder horizontally and penetrates said left end cover, said left seal, said right seal and said right end cover, said sealing ring is formed by said left seal and said right seal, said piston rod has one side connected to a high-speed driving device with a motor, said high-speed driving device comprises said motor, an eccentric wheel affixed on an output shaft of said motor, a connecting member affixed on one side of said piston rod, said connecting member and a joint bearing are hinged together, said joint bearing has a left side affixed to a right side of a guiding rod, a left side of said guiding rod is a circular ring, and a rolling bearing is installed between an inner side of said circular ring and an outer side of said eccentric wheel, said motor drives said eccentric wheel, said rolling bearing, said guiding rod and said piston rod, and restricts a degree of movement of said piston rod so as to realize a high-speed reciprocating linear movement of said piston rod.

2. The testing platform with a floating cylinder for high-pressure and high-speed reciprocating sealing experiment accordingly to claim 1, wherein said cylinder is positioned on top of said frame, said frame comprises a left support seat located at a left side of said cylinder and a right support seat located at a right side of said cylinder, wherein a left linear bearing having an outer wall matched and fixed within a mounting hole of said left support seat and is supported through said left support seat to secure into position, a right linear bearing having an outer wall matched and fixed within a mounting hole of said right support seat and is supported through said right support seat to secure into position, said piston rod penetrates through said left linear bearing and said right linear bearing.

* * * * *